(12) United States Patent
Saito

(10) Patent No.: US 12,325,548 B2
(45) Date of Patent: Jun. 10, 2025

(54) CONTAINER FILLING AND SEALING APPARATUS

(71) Applicant: SHIBUYA PACKAGING SYSTEM CORPORATION, Kanazawa (JP)

(72) Inventor: Mamoru Saito, Kanazawa (JP)

(73) Assignee: SHIBUYA PACKAGING SYSTEM CORPORATION, Kanazawa (JP)

(*) Notice: Subject to any disclaimer, the term of this patent is extended or adjusted under 35 U.S.C. 154(b) by 82 days.

(21) Appl. No.: 18/518,598

(22) Filed: Nov. 24, 2023

(65) Prior Publication Data
US 2024/0174390 A1 May 30, 2024

(30) Foreign Application Priority Data
Nov. 28, 2022 (JP) .................. 2022-189251

(51) Int. Cl.
B65B 35/24 (2006.01)
B65B 5/04 (2006.01)
(Continued)

(52) U.S. Cl.
CPC .................. *B65B 7/16* (2013.01); *B65B 5/04* (2013.01); *B65B 7/2807* (2013.01); *B65B 7/2842* (2013.01); *B65B 7/2878* (2013.01); *B65B 35/24* (2013.01); *B65B 43/44* (2013.01); *B65B 43/52* (2013.01); *B65B 65/003* (2013.01);
(Continued)

(58) Field of Classification Search
CPC ........... B65B 5/04; B65B 7/16; B65B 7/2807; B65B 7/2842; B65B 7/2878; B65B 35/24; B65B 35/44; B65B 35/54; B65B 43/44; B65B 43/52; B65B 65/003; B65B 65/006;
(Continued)

(56) References Cited

U.S. PATENT DOCUMENTS

| 842,209 | A | * | 1/1907 | Knapp et al. | ........ | B65G 47/082 |
| | | | | | | 198/426 |
| 842,210 | A | * | 1/1907 | Knapp et al. | ........ | B65G 47/082 |
| | | | | | | 192/125 B |

(Continued)

FOREIGN PATENT DOCUMENTS

| JP | 59172325 | A | * | 9/1984 | ........... B65G 47/681 |
| JP | 4319608 | B2 | * | 8/2009 | |

(Continued)

Primary Examiner — Stephen F. Gerrity
(74) Attorney, Agent, or Firm — MORI & WARD, LLP

(57) ABSTRACT

A container filling and sealing apparatus includes a first conveyor having m lanes and configured to convey articles in the m lanes; a container supply device configured to place containers over the articles, respectively; a container reverser configured to reverse the containers so as to insert the articles inside the containers while the containers are covering the articles; a second conveyor arranged downstream of the first conveyor and configured to convey the containers containing the articles in n lanes which are less than the m lanes, n being a natural number of 2 or more; a delivery conveyor provided between the first conveyor and the second conveyor and configured to receive from upstream m containers as a unit containing the articles and deliver downstream n containers as a unit; and a sealing device configured to seal an opening in each of the containers conveyed by the second conveyor.

2 Claims, 2 Drawing Sheets

(51) Int. Cl.
   *B65B 7/16*   (2006.01)
   *B65B 7/28*   (2006.01)
   *B65B 43/44*   (2006.01)
   *B65B 43/52*   (2006.01)
   *B65B 65/00*   (2006.01)
   *B65G 47/252*   (2006.01)
   *B65G 47/68*   (2006.01)
   *B65G 47/71*   (2006.01)

(52) U.S. Cl.
   CPC .......... *B65B 65/006* (2013.01); *B65G 47/252* (2013.01); *B65G 47/681* (2013.01); *B65G 47/71* (2013.01)

(58) Field of Classification Search
   CPC .. B65G 47/082; B65G 47/252; B65G 47/681; B65G 47/71
   USPC .................................... 53/282; 198/426, 433
   See application file for complete search history.

(56) References Cited

U.S. PATENT DOCUMENTS

| | | | | |
|---|---|---|---|---|
| 2,596,339 | A * | 5/1952 | Lufkin | B65B 21/22 |
| | | | | 414/609 |
| 3,224,549 | A * | 12/1965 | Cella et al. | B65B 35/54 |
| | | | | 53/538 |
| 3,319,763 | A * | 5/1967 | Van Der Winden | B65G 47/088 |
| | | | | 198/408 |
| 3,368,766 | A * | 2/1968 | Livingston | B65H 67/06 |
| | | | | 53/142 |
| 3,389,776 | A * | 6/1968 | Carvallo | B65G 47/681 |
| | | | | 198/530 |
| 3,412,843 | A * | 11/1968 | Maulini | B65B 35/54 |
| | | | | 198/550.8 |
| 3,583,545 | A * | 6/1971 | Hovekamp | B65G 47/71 |
| | | | | 414/796 |
| 4,771,589 | A * | 9/1988 | Mueller et al. | B65B 35/54 |
| | | | | 53/448 |
| 5,230,201 | A * | 7/1993 | Iuchi et al. | B65B 5/04 |
| | | | | 198/482.1 |
| 10,112,776 | B2 * | 10/2018 | Rasi | B65G 47/71 |
| 11,453,519 | B2 * | 9/2022 | Hahn | B65G 47/082 |
| 2006/0105077 | A1 * | 5/2006 | Keller | B65G 47/252 |
| | | | | 425/540 |
| 2014/0137510 | A1 * | 5/2014 | Lang | B65B 35/24 |
| | | | | 53/55 |
| 2015/0027084 | A1 * | 1/2015 | Navarro Rosales et al. | |
| | | | | B65B 5/04 |
| | | | | 53/251 |
| 2015/0122397 | A1 * | 5/2015 | Stuhlmann et al. | B65G 47/681 |
| | | | | 156/60 |

FOREIGN PATENT DOCUMENTS

| | | | |
|---|---|---|---|
| JP | 4492970 | B2 | 6/2010 |
| JP | 7039920 | B2 | 3/2022 |

\* cited by examiner

CONTAINER FILLING AND SEALING APPARATUS

CROSS-REFERENCE TO RELATED APPLICATIONS

The present application claims priority under 35 U.S.C. §119 to Japanese Patent Application No. 2022-189251, filed Nov. 28, 2022. The contents of this application are incorporated herein by reference in their entirety.

BACKGROUND OF THE INVENTION

1. Field of the Invention

The present invention relates to a container filling and sealing apparatus.

2. Description of the Related Art

As disclosed in Japanese Patent Nos. 4,492,970 and 7,039,920, an instant noodle manufacturing apparatus includes an upstream noodle machine (i.e., a machine that processes raw materials by kneading, stretching, cutting, collecting, frying, etc.) and a downstream filling sealing machine (i.e., a machine that fills containers with ingredients, seals lids, inspects, etc.). In a conventional instant noodle-manufacturing apparatus, from the upstream noodle machine to the downstream filling and sealing machine, the number of conveyors is adjusted to align with the number of product lanes in the noodle machine.

SUMMARY OF THE INVENTION

According to one aspect of the present invention, a container filling and sealing apparatus includes a first conveyor having m lanes and configured to convey articles in the m lanes; a container supply device configured to place containers over the articles, respectively; a container reverser configured to reverse the containers so as to insert the articles inside the containers while the containers are covering the articles; a second conveyor arranged downstream of the first conveyor and configured to convey the containers containing the articles in n lanes which are less than the m lanes, n being a natural number of 2 or more; a delivery conveyor provided between the first conveyor and the second conveyor and configured to receive from upstream m containers as a unit containing the articles and deliver downstream n containers as a unit; and a sealing device configured to seal an opening in each of the containers conveyed by the second conveyor.

From another aspect of the present invention, the delivery conveyor further includes a circulating linear conveyor that conveys the containers containing the articles from the first conveyor to the second conveyor.

BRIEF DESCRIPTION OF THE DRAWINGS

The objects and advantages of the present invention will be better understood from the following description with references to the accompanying drawings in which.

DESCRIPTION OF THE PREFERRED EMBODIMENTS

Figure 1:
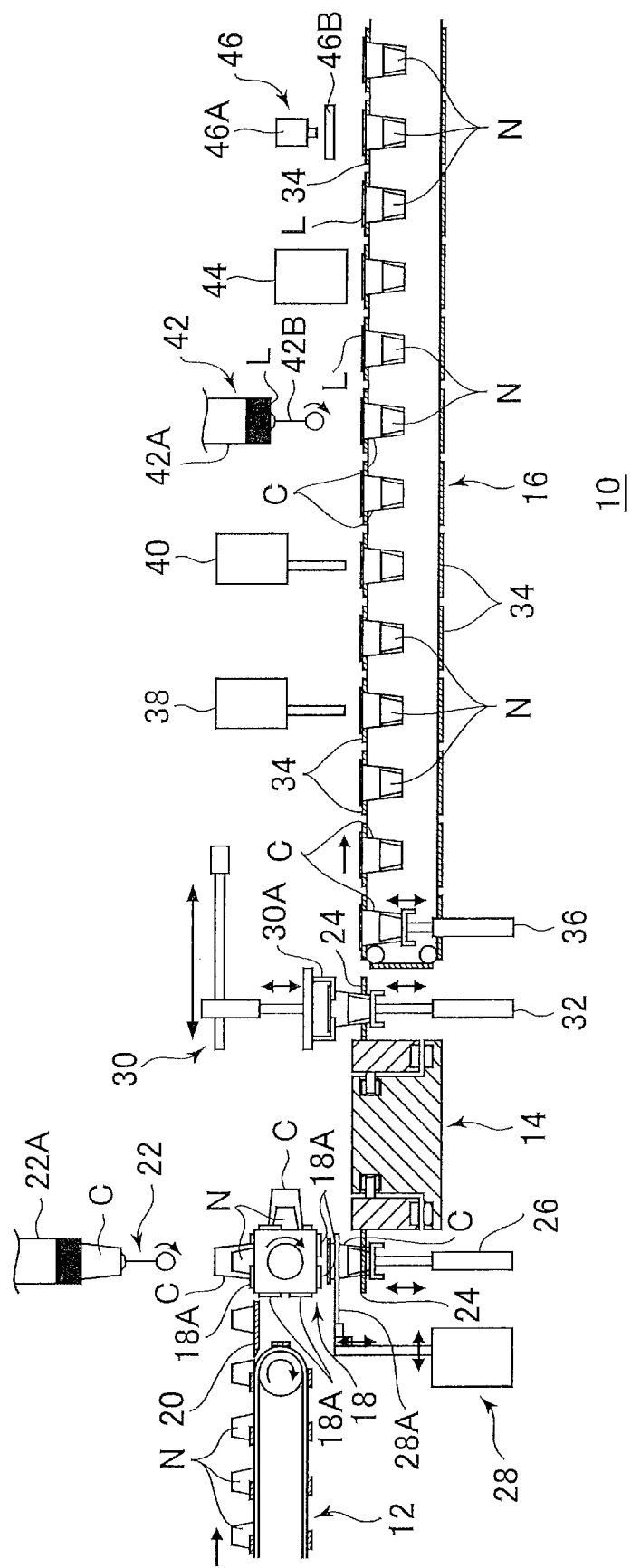
FIG. 1 is a side view schematically illustrating the arrangement of a container filling and sealing apparatus of an embodiment of the present invention.

The embodiments according to the present invention are described below with reference to the drawings. FIG. 1 is a side view schematically illustrating the arrangement of a container filling and sealing apparatus of an embodiment of the present invention.

The container filling and sealing apparatus 10 of the present embodiment conveys raw noodle blocks N in 12 lanes by a first conveyor 12 from an upstream noodle machine (not shown) and accommodates each noodle block N in an individual container C. The containers C with the noodle blocks N are then delivered via a circulating linear conveyor (delivery conveyor) 14 to a second conveyor 16 having 8 lanes. On the second conveyor 16, powdered soup and other ingredients are filled into the containers C, and the opening of each container C is sealed with a lid L. In the noodle machine, raw noodles are grouped by predetermined weight (product) and fried in 12 lanes at a predetermined temperature for a predetermined time. Then, the noodles are conveyed to the first conveyor 12 in 12 lanes of noodle blocks N. In the present embodiment, although the first conveyor 12 conveys the noodle blocks N in 12 lanes and the second conveyor 16 conveys containers C containing the noodle blocks N in 8 lanes, these numbers of lanes are just examples and can be altered.

On the downstream side of the first conveyor 12, a reversing block (container reverser) 18 is arranged along the width direction of the first conveyor 12. The reversing block 18 is a rectangular parallelepiped with a square cross-section. The reversing block 18 extends along the width of the first conveyor 12 at approximately the same length as the width of the first conveyor 12. The reversing block 18 is rotatable about its central axis extending in the longitudinal direction by 90 degrees so that each surface of the reversing block 18 is sequentially oriented in the vertical and horizontal directions. The top surface of the reversing block 18 is arranged at approximately the same height as the conveying surface of the first conveyor 12. A transfer plate 20 is disposed between the downstream end of the first conveyor 12 and the top surface of the reversing block 18 for transferring the noodle blocks N from the first conveyor 12 onto the reversing block 18.

A container supply device 22 is arranged above the reversing block 18. The container supply device 22 attaches the bottom surface of the lowest container C in a cartridge 22A and pulls the containers C out from the cartridge 22A one by one. The device 22 then places each container C on the top surface of the reversing block 18 to cover the noodle blocks N transferred thereon. On the top surface of the reversing block 18, the first row (12 units) of noodle blocks N of the 12 lanes are transferred almost simultaneously from the first conveyor 12 by a transfer device (not shown). When a container C is placed upside down over each noodle block N, the container C is fixed on the reversing block 18 by a container locking mechanism 18A provided on each side of the reversing block 18. The reversing block 18 is then rotated 90 degrees in a direction in which the top surface of the block 18 moves away from the transfer plate 20. Thereafter, the noodle blocks N in the next row of noodle block lanes on the first conveyor 12 are delivered to the top surface of the reversing block 18, which is turned upward, and the same process is repeated.

Located in a receiving position below the reversing block 18 is a carrier transport route that includes a plurality of retainers 24 provided on the linear conveyor 14. Each retainer 24 includes a plate member that extends outward in certain sections of the circulating track of the linear conveyor 14. Each retainer 24 is provided with a hole for holding a container C with the noodle block N. A first lifting device 26 located below the reversing block 18 is disposed below the retainers 24 and is movable up and down relative to the holes of the retainers 24. Furthermore, on the opposite side of the linear conveyor 14 with respect to the first lifting device 26 is arranged a first container transfer device 28 that transfers the containers C held on the reversing block 18 to the retainers 24.

The first lifting device 26 includes a mounting table on which 12 containers C are placed, and an actuator for raising and lowering this mounting table. The first container transfer device 28 includes grippers 28A that grip below the openings of the containers C held by the container locking mechanisms 18A on the bottom side of the reversing block 18. The grippers 28A can be raised and lowered and moved horizontally back and forth toward the linear conveyor 14 by an actuator (not shown). After being released from the container locking mechanisms 18A, each container C gripped by the grippers 28A is inserted from directly above into the hole of the corresponding retainer 24. The 12 containers C gripped by the grippers 28A are lowered and put onto the mounting table of the first lifting device 26 in the lifted position. When the 12 containers C are delivered to the mounting table of the first lifting device 26, the grippers 28A release the containers C. When the first lifting device 26 is lowered to the lowered position, the 12 containers C fit completely into the holes of the corresponding 12 retainers 24. As each of the 12 containers C is held inside the hole of one of the 12 retainers 24, the 12 carriers holding the containers C at the receiving position are moved to the upstream side of a delivery position. At the same time, 12 other carriers among the carriers standing by on the upstream side of the receiving position, in which retainers 24 do not carry containers C, are moved into the receiving position. Furthermore, the mounting table of the first lifting device 26 is raised to the lifted position, and the same processes are repeated.

Figure 2:
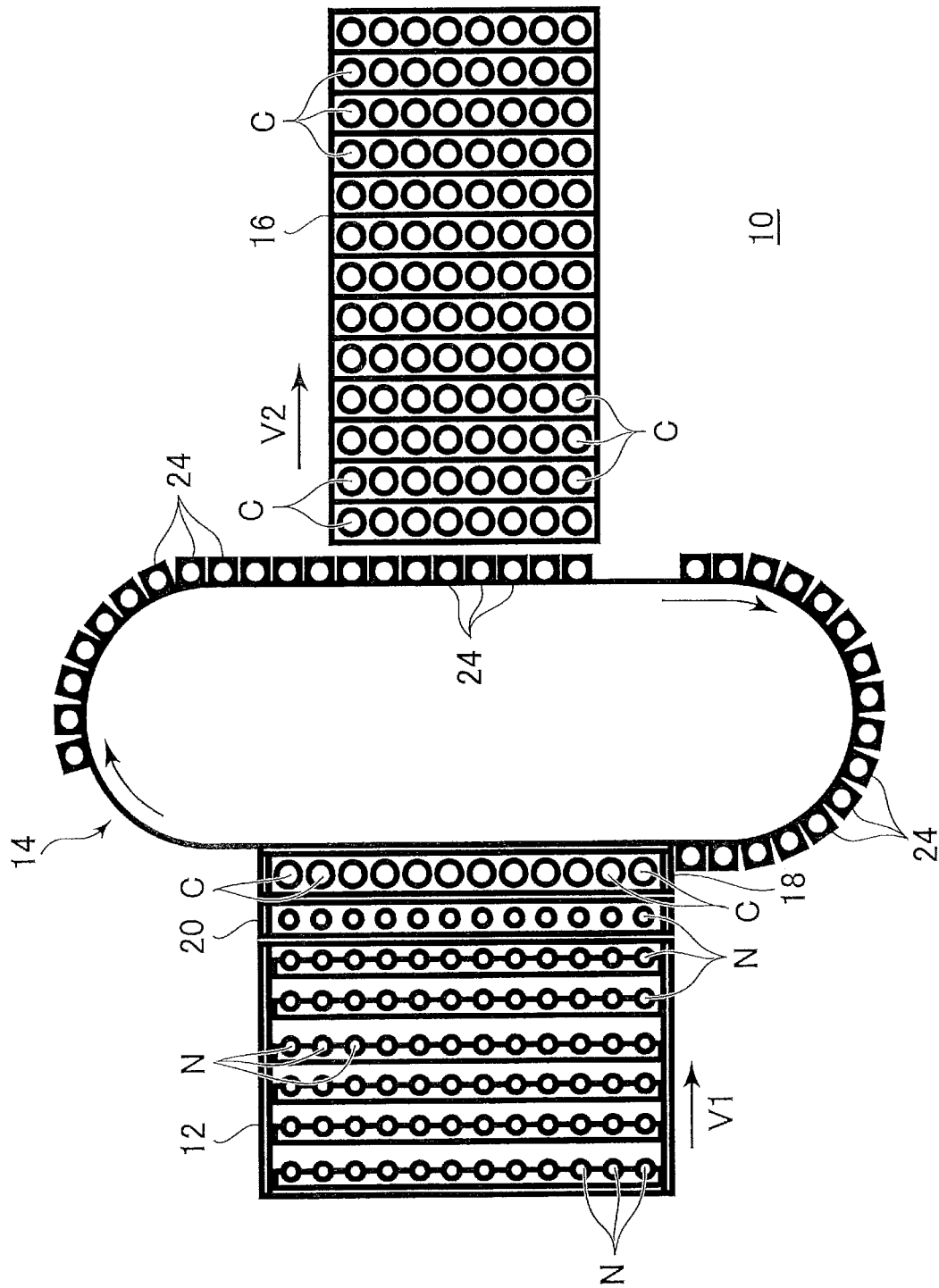
FIG. 2 is a plan view illustrating an arrangement of the first conveyor, the linear conveyor, and the second conveyor.

FIG. 2 is a plan view illustrating an arrangement of the first conveyor 12, the linear conveyor 14, and the second conveyor 16. Each carrier of the linear conveyor 14 is movable independently along the circulating track. Twelve carriers each provided with one individual retainer 24 stand by at the receiving position below the reversing block 18. In this condition, 12 containers C held by the reversing block 18, which correspond to one row of the noodle block lanes with each container C containing one noodle block N, are simultaneously delivered to the 12 carriers that stand by beneath the reversing block 18 via the first container transfer device 28 and the first lifting device 26.

As illustrated in FIG. 2, the linear conveyor 14 has a flat oval-shaped track, that is, a circulating conveyance route of the linear conveyor 14 is formed by a pair of straight sections and a pair of semicircular curved sections that connect each end of the straight sections. One straight section of the oval track is arranged along the longitudinal direction of the reversing block 18 (the width direction of the downstream end of the first conveyor 12). On the other hand, the other straight section of the oval track is arranged along the width direction of the upstream end of the second conveyor 16. The 12 carriers that received the containers C from the reversing block 18 at the receiving position, which is in one linear section, are moved along the oval track to the delivery position in the linear section on the other side. In the linear conveyor 14A, a plurality of electromagnets are provided in line along a circulating conveyance route and a permanent magnet is provided in each carrier. The carriers are moved by a linear motor drive, and the current supplied to the electromagnets provided along the conveyance route is controlled by a controller (not shown). The position and transfer speed of each carrier are adjusted by the current supplied to the electromagnets.

A second container transfer device 30 is disposed above the retainers 24 positioned adjacent to the upstream end of the second conveyor 16, at the delivery position in the second straight (linear) section. The second container transfer device 30 includes grippers 30A that grip a section below the openings of the containers C that are held by the retainers 24. The grippers 30A can be raised and lowered and moved horizontally back and forth toward the second conveyor 16. Furthermore, below the 8 retainers 24, which are positioned adjacent to the upstream end of the second conveyor 16, a second lifting device 32 is arranged that is movable up and down relative to the holes of the retainers 24.

The second lifting device 32 includes 8 mounting tables on which the containers C are placed, and an actuator for raising and lowering the mounting tables. When the second lifting device 32 is lifted, the bottom surfaces of the containers C are supported by the mounting tables of the second lifting device 32, and each container C is lifted off of the retainers 24. Each gripper 30A of the second container transfer device 30 then grips the 8 containers C below their openings and moves them to an area above the second conveyor 16.

The second conveyor 16 is a conveyor in which a plurality of retainers 34 are bridged over a pair of chains. Each retainer 34 supports one row of containers C (8 containers C.) Each retainer 34 is provided with eight holes for receiving the containers C, and the containers C are conveyed on the second conveyor 16 in eight lanes.

A third lifting device 36 is arranged below the retainer 34 located at the upstream end of the second conveyor 16. The third lifting device 36 includes mounting tables disposed below the retainer 34 located at the upstream end of the second conveyor 16, and an actuator provided on the side of the second conveyor 16 for raising and lowering the mounting tables. The grippers 30A of the second container transfer device 30 transfer n (i.e., 8) containers C to positions directly above the corresponding holes of the retainer 34 located at the upstream end of the second conveyor 16. Thereby, each container C is placed on a mounting table of the third lifting device 36 in the lifted position. Thereafter, the mounting tables of the third lifting device 36 are lowered to the lowered position, and the n (8) containers C are simultaneously fitted into each corresponding hole of the retainer 34 located at the upstream end of the second conveyor 16. Accordingly, the transfer process of the containers C from the linear conveyor to the second transport conveyor 16 is completed. When the n (8) containers C are gripped by the grippers 30A of the second container transfer device 30 and moved away from the retainers 24, the n (8) carriers that have already delivered their containers C at the delivery position are moved to the upstream section of the receiving position and the mounting tables of the second lifting device 32 are lowered to the lowered position. Furthermore, among the carriers that stand by in the upstream section of the delivery position, n (8) carriers carrying the containers C in their retainers 24 are moved to the delivery position, and the same processes are repeated.

Incidentally, the speed at which the second container transfer device 30 transfers n (8) containers C from the linear conveyor 14 to the second conveyor 16 is controlled by the controller to be approximately m/n times the speed at which m (12) containers C are transferred from the reversing block 18 to the linear conveyor 14. Furthermore, the conveyance speed V2 of the second conveyor 16 is set to approximately m/n (>1) times the conveyance speed V1 of the first conveyor 12, i.e., V2=m/n×V1. In this case, it is desirable that more carriers than the number (12) handled by the first container transfer device 28 are accumulated on the upstream side of the receiving position. Similarly, it is desirable that at least as many carriers as the number (8) of carriers handled by the second container transfer device 30 are accumulated on the upstream side of the delivery position. That is, by controlling the next-in-line m (12) carriers without containers C on their retainers 24 to stand by upstream of the receiving position until the m (12) containers C are delivered in each hole of the retainers 24 of the m (12) carriers at the receiving position, the next m (12) containers C can be immediately delivered to the next m (12) carriers. Similarly, by controlling at least n (8) carriers to stand by upstream of the delivery position before the n (8) containers C are delivered from the n (8) carriers C on the linear conveyor 14 to the second conveyor 16, the next n (8) containers C can be immediately delivered from the linear conveyor 14 to the second conveyor 16.

The second conveyor 16 transports the containers C with noodle blocks N while filling powdered soup and other ingredients into the containers C, then seals the openings of the containers C with a lid L, and further inspects the sealing conditions. As illustrated in FIG. 1, above the second conveyor 16, n (8) units of powdered soup filling devices 38, other ingredients filling devices 40, lid supply devices 42, lid sealing devices 44, and inspection devices 46 are arranged in this order from upstream to the downstream.

The second conveyor 16 is driven intermittently and stops for a certain periods of time when the containers C are positioned directly below each of the devices 38, 40, 42, 44, and 46. The powdered soup filling devices 38 and the other ingredients filling devices 40 supply powdered soup and other ingredients, respectively, into n (8) containers C positioned directly below each of the devices 38 and 40. The lid supply device 42 includes a cartridge 42A that holds the stacked lids L, and a rotary arm 42B provided between the cartridge 42A and the second conveyor 16. A suction cup is provided on the tip end of the rotary arm 42B and extracts the lids L held in the cartridge 42A one by one. The rotary arm 42B is then rotated 180 degrees and places the lids L on the openings of each container C.

The containers C with lids L placed on the openings are conveyed beneath the lid sealing devices 44 by the second conveyor 16. The lid sealing devices 44 are, for example, heat sealers or ultrasonic sealers, and the sealing head of the lid sealing devices 44 is pressed against the opening of the container C covered with the lid L from above. Thereby, the outer periphery of the lid L is adhered to the opening edge of each container C. The container C to which the lid L is attached by the lid sealing device 44 is inspected below the inspection device 46 to determine whether the lid L is properly attached. For example, the inspection device 46 includes a camera 46A and a ring light 46B. Thereby, the inspection device 46 detects the positional deviation of the lid L from the container C with reference to an image captured by the camera 46A and determines whether the product quality is acceptable.

After the containers C are filled with noodle blocks N, powdered soup, other ingredients, etc., sealed with a lid L, and inspected for product quality, the containers C are further conveyed under downstream processing devices by a second conveyor 16. During this process, containers C determined to be defective are discharged from the product line by a discharge device (not shown).

As described above, according to the present embodiment, the m containers conveyed in m lanes by the upstream first conveyor can be delivered to the downstream second conveyor that conveys the containers in n (<m) lanes via the circulating linear conveyor, so that the conveyance speed V2 of the second conveyor can be set approximately m/n (>1) times the conveyance speed V1 of the first conveyor (V2=m/n×V1). Thereby, even though the processing capacities of the upstream and downstream devices are different, both the upstream and downstream device can be operated at an appropriate processing rate by accommodating the ratio of the number of lanes on the upstream and downstream conveyors to the ratio of processing capacity.

For example, on the downstream side (the second conveyor) of the container filling and sealing apparatus of the present embodiment, the number of ingredient filling devices, sealing devices, and inspection devices can be reduced by increasing the conveyance speed of the downstream lanes as well as reducing the number of lanes, compared to the number of upstream lanes with low processing capacity. Thereby, the manufacturing costs can be reduced.

Furthermore, since the width of the second conveyor is narrowed, workability and cleaning efficiency are improved, and maintenance efficiency is improved because fewer spare parts are required to be stored. Moreover, since the linear conveyor (linear conveyance device) is interposed between the first and second conveyors, noodle scraps generated in the noodle machine are not brought into the downstream side. As a result, cleaning performance is improved and running costs are reduced.

Note that each carrier can be independently transferred in the linear conveyor (linear conveyance device) and some carriers can be accumulated on the conveyor track of the linear conveyor so that the difference between the numbers of products supplied on the upstream side (i.e., m) and discharged on the downstream side (i.e., n) can be absorbed by the linear conveyor.

In the present embodiment, each carrier of the linear conveyor 14 includes the retainer 24 provided with a hole for receiving a container C for conveyance. However, each carrier may be provided with a gripper that grips a container C so that the containers C may be held and conveyed by the gripper instead.

Furthermore, in the present embodiment, only one hole for holding the container C is formed in the retainer 24 of each carrier of the linear conveyor 14, so that one carrier can hold and transport only one container. However, a plurality of holes for holding containers may be formed in the retainer 24 and one carrier may hold and transport a plurality of containers. In such case, it is preferable that the number of holes formed in the retainer 24 be a common divisor of the numbers of lanes in the first conveyor and the second conveyor.

In the present embodiment, a linear conveyor is adopted as a delivery conveyor between the first conveyor and the second conveyor, and receives m containers from the upstream first conveyor and delivers n containers to the downstream second conveyor. However, the delivery conveyor is not limited to the present invention, and for example, a servo table in which movable tables are arranged to configure the circulating track may also be used so that the tables are moveable back and forth and circulated along the track. Furthermore, any other known art can also be adopted.

Although the embodiment of the present invention has been described herein with reference to the accompanying drawings, obviously many modifications and changes may be made by those skilled in this art without departing from the scope of the invention.

The invention claimed is:

1. A container filling and sealing apparatus, comprising:
   a first conveyor having m lanes and configured to convey articles in the m lanes;
   a container supply device configured to place containers over the articles, respectively;
   a container reverser configured to reverse the containers so as to insert the articles inside the containers while the containers are covering the articles;
   a second conveyor arranged downstream of the first conveyor and configured to convey the containers containing the articles in n lanes which are less than the m lanes, n being a natural number of 2 or more;
   a delivery conveyor provided between the first conveyor and the second conveyor and configured to receive from upstream m containers as a unit containing the articles and deliver downstream n containers as a unit; and
   a sealing device configured to seal an opening in each of the containers conveyed by the second conveyor.

2. A container filling and sealing apparatus according to claim 1, wherein the delivery conveyor comprises a circulating linear conveyor that conveys the containers containing the articles from the first conveyor to the second conveyor.

\* \* \* \* \*